United States Patent [19]

Takahashi

[11] Patent Number: 4,531,425
[45] Date of Patent: Jul. 30, 1985

[54] REVERSE GEAR SELECTOR MECHANISM WITH MEANS FOR PREVENTING TRANSMISSION SLIPPING OUT OF REVERSE GEAR

[75] Inventor: Kohtei Takahashi, Sagamihara, Japan
[73] Assignee: Nissan Motor Company, Ltd., Japan
[21] Appl. No.: 486,447
[22] Filed: Apr. 19, 1983

[30] Foreign Application Priority Data
May 6, 1982 [JP] Japan ................................. 57-75790

[51] Int. Cl.³ .......................... G05G 5/10; G05G 9/12
[52] U.S. Cl. .................................. 74/477; 74/473 R
[58] Field of Search ............................. 74/473 R, 477

[56] References Cited

U.S. PATENT DOCUMENTS

| | | | |
|---|---|---|---|
| 1,854,281 | 4/1932 | Thompson . | |
| 2,118,090 | 5/1938 | Kurtil | 74/475 |
| 2,531,701 | 11/1950 | Price | 74/477 X |
| 2,772,652 | 12/1956 | Du Shane et al. | 74/477 X |
| 2,775,134 | 12/1956 | Swenson | 74/477 X |
| 3,172,301 | 3/1965 | Hurst | 74/473 R |
| 3,216,274 | 11/1965 | Hurst | 74/476 |
| 3,306,126 | 2/1967 | Hobbins | 74/473 R |

FOREIGN PATENT DOCUMENTS

| | | |
|---|---|---|
| 1555932 | 6/1966 | Fed. Rep. of Germany . |
| 1650820 | 9/1967 | Fed. Rep. of Germany . |
| 2713784 | 3/1977 | Fed. Rep. of Germany . |
| 938467 | 8/1962 | United Kingdom . |

Primary Examiner—Allan D. Herrmann
Attorney, Agent, or Firm—Lowe, King, Price & Becker

[57] ABSTRACT

In a reverse gear selector mechanism of this invention, two connector pins are provided to drivingly connect a shifter to a shift fork. The connector pin locks the shift fork with a shifter bracket side flange when a reverse idler gear is in a shift position where it carries power.

6 Claims, 8 Drawing Figures

REVERSE GEAR SELECTOR MECHANISM WITH MEANS FOR PREVENTING TRANSMISSION SLIPPING OUT OF REVERSE GEAR

BACKGROUND OF THE INVENTION

1. Field of the Invention

The present invention relates in general to automotive manual transmissions and particularly to a reverse gear selector mechanism with means for preventing a transmission slipping out of reverse gear.

2. Description of the Prior Art

In many prior art automotive manual transmissions, a sliding gear that is moved by a shifting yoke or the like is used for reverse gear. The transmission with such a sliding gear is encountered by a problem that it may slip out of gear when the sliding gear is under load.

Various measures have been proposed to solve this problem but none of them are satisfactory because they are deficient in practicality.

SUMMARY OF THE INVENTION

In accordance with the present invention, there is provided a novel and improved reverse gear selector mechanism for use in a transmission having a case and a reverse idler gear movable between a first shift position where it is incapable of carrying power and a second shift position where it is capable of carrying power.

The mechanism comprises a striking rod rotatably and axially movably mounted on the transmission case, a striking lever carried on the striking rod and having a finger, a shifter bracket fixedly mounted on the transmission case and having a side flange, a pivot pin attached to the side flange, a shift fork pivotally mounted on the pivot pin and arranged to partially overlie the shifter bracket side flange, the shift fork being operatively connected with the reverse idler gear and operative to move same into the first and second shift positions when rotated about the pivot pin, a shifter pivotally mounted on the pivot pin and arranged to partially overlie the shift fork, the shifter being engageable with the finger of the striking lever and rotatable about the pivot pin when the striking rod is axially moved, and means for drivingly connecting the shifter with the shift fork to allow them to rotate together and releasably locking the shift fork with the shifter bracket side flange when the reverse idler gear is in the second shift position.

The above structure provides highly reliable means for preventing a transmission slipping out of reverse gear, which means are quite excellent in practicality.

It is accordingly an object of the present invention to provide a reverse gear selector mechanism provided with means for preventing a transmission slipping out of reverse gear, which means is highly reliable in operation and readily adoptable to automotive manual transmission.

It is another object of the present invention to provide a reverse gear selector mechanism of the above described character which is quite simple in structure though highly reliable in operation.

BRIEF DESCRIPTION OF THE DRAWINGS

The features and advantages of the reverse gear selector mechanism according to the present invention will become more clearly appreciated from the following description taken in conjunction with the accompanying drawings, in which.

DESCRIPTION OF THE PREFERRED EMBODIMENT

Referring to FIGS. 1 to 6, inclusive, an automotive manual transmission is shown as comprising a transmission case 10 and a reverse idler gear 12 rotatably and slidably mounted on an idler shaft 14 that extends horinzontally across the transmission case 10 and is mounted on same.

Figure 4:
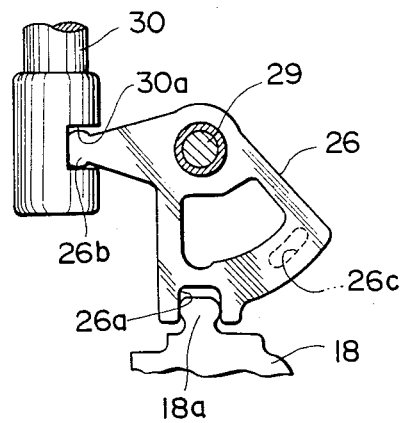
FIG. 4 is a top plan view of a shifter utilized in the reverse gear selector mechanism of FIG. 1.
Figure 5:
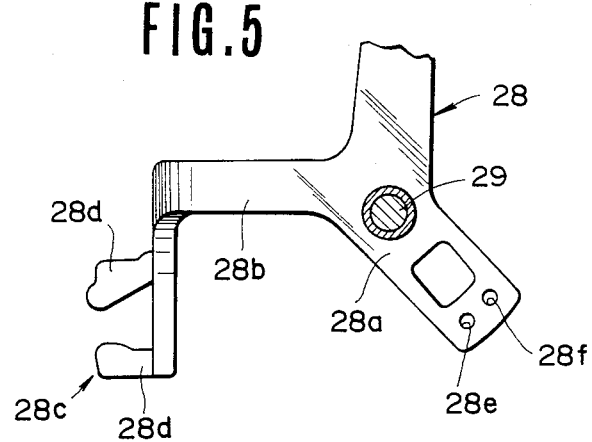
FIG. 5 is a top plan view of a shift fork utilized in the reverse gear selector mechanism of FIG. 1.
Figure 6:
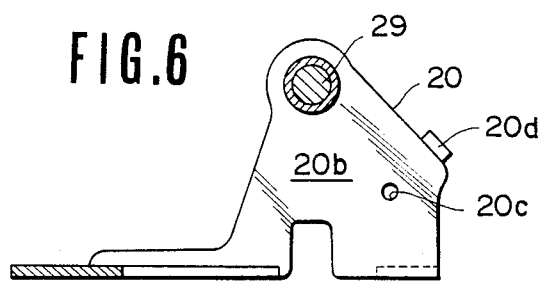
FIG. 6 is a horizontal section of a shifter bracket utilized in the reverse gear selector mechanism of FIG. 1.

A gear selector mechanism for the transmission includes a striking rod 16 rotatably and axially movably mounted on the transmission case 10 and a striking lever 18 having a finger 18a, fixedly mounted on the striking rod 16 to move together therewith. Though not shown in the drawing, the striking rod 16 has a plurality of suitably spaced notches that are engageable with a spring-loaded detent or shift check ball that holds the striking rod 16 at a predetermined position to which it has been shifted. The gear selector mechanism also includes a shifter bracket 20 fixedly attached to the transmission case 10. The shifter bracket 20 has a pair of opposed (upper and lower) side flanges 20a and 20b between which three shifters 22, 24 and 6 and one shift fork 28 are arranged to lie one above another and pivotally mounted on a pivot pin 29 that spans the space between the side flanges 20a and 20b and is attached to same. The shifter 22 is a 1st & 2nd shifter for selection of first and second gears, and the shifter 24 is a 3rd & 4th shifter for selection of third and fourth gears. The shifters 22 and 24 are of the same bell crank-like lever and respectively formed at one ends with notches 22a and 24a for receiving therein the finger 18a of the striking lever 18. The shifter 26 is a 5th & reverse shifter for selection of fifth and reverse gears and constructed as a bell crank-like lever that differs in shape from that of the shifters 22 and 24, as best shown in FIG. 4. The shifter 26 is also formed at an end with a notch 26a for receiving therein the finger 18a of the striking lever 18. By rotating the striking rod 16 about its axis, the finger 18a of the striking lever 18 can be selectively engaged with one of the notches 22a, 24a and 26a and therefore with one of the shifters 22, 24 and 26.

The shifters 22, 24 and 26 are operatively connected at the other ends with shift forks 30, 32 and 34 for selection of forward gears, respectively. The shift forks are made of aluminum and movably mounted on a fork shaft though not shown in the drawing. For the above operative connection with the shifters, the shift forks 30, 32 and 34 are formed at an end opposite to a forked end with notches 30a, 32a and 34a in which the other ends 22b, 24b and 26b of the shifters 22, 24 and 26 are received, respectively.

The shift fork 28 has a horizontal, flat-walled joint portion 28a where it is pivotally mounted on the pivot pin 29 and movably interposed between the 5th & reverse shifter 26 and the lower side flange 20b of the shifter bracket 20. The shift fork 28 also has a downwardly bent arm portion 28b that extends consecutively from the joint portion 28a and in part extends downwardly to temrinate at a forked end 28c having a pair of fingers 28d and 28d. The forked end 28c is so constructed and arranged as to partly straddle the circumference of the reverse idler gear 12 and to engage at the fingers 28d and 28d with the opposed side surfaces of the reverse idler gear, that is, the forked end fingers 28d and 28d are placed on the respective sides of the reverse idler gear to hold therebetween the reverse idler gear. With the above structure, the shift fork 28 is capable of directly moving the reverse idler gear 12 along the axis of the idler shaft 14 when rotated about the pivot pin 30.

Figure 1:
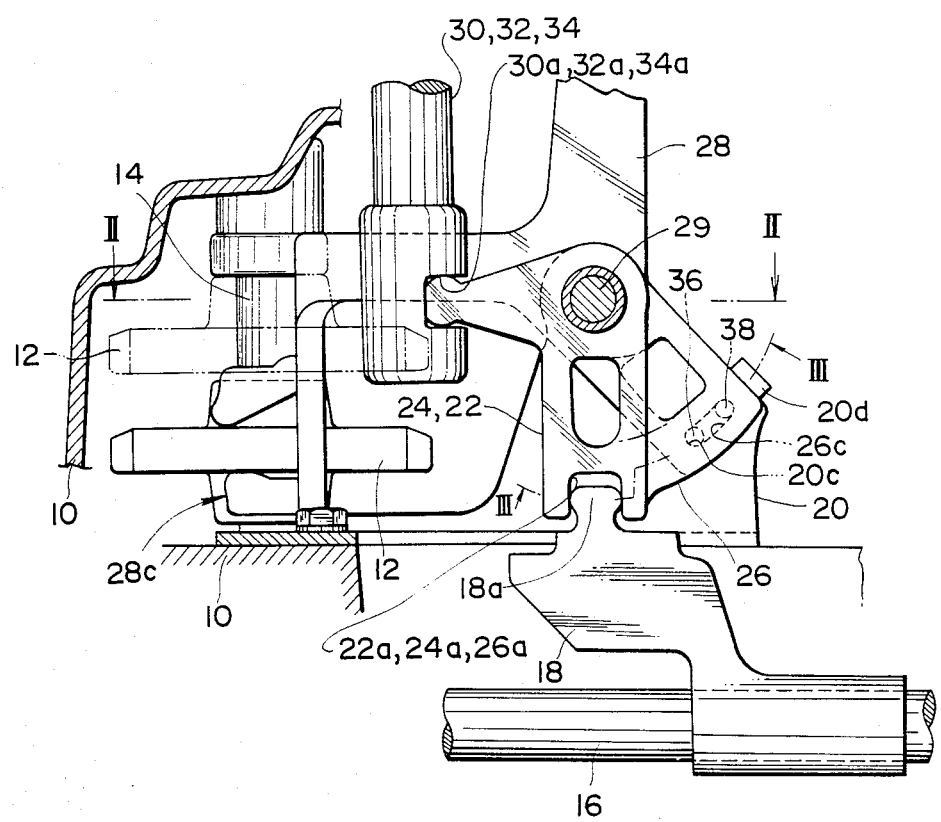
FIG. 1 is a fragmentary horizontal section of an automotive manual transmission incorporating a reverse gear selector mechanism according to the present invention.
Figure 2:
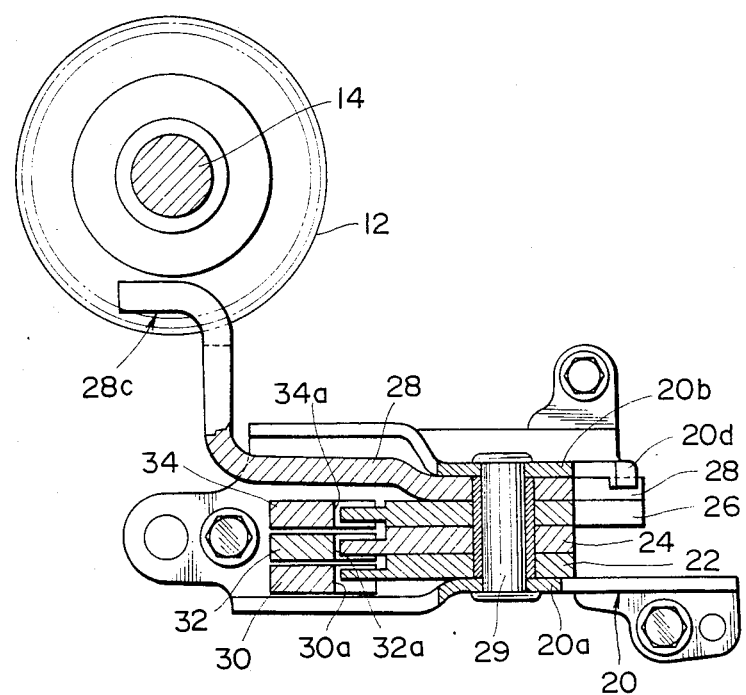
FIG. 2 is a section taken along the line II—II of FIG. 1.
Figure 3A:
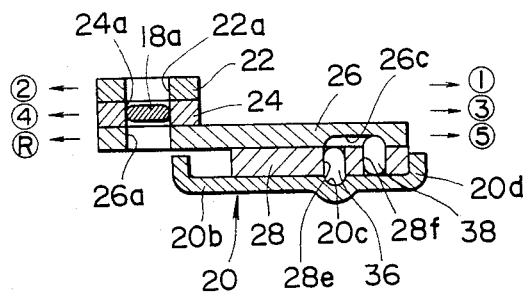
FIG. 3A is a sectional development taken along the line III—III of FIG. 1.
Figure 3B:
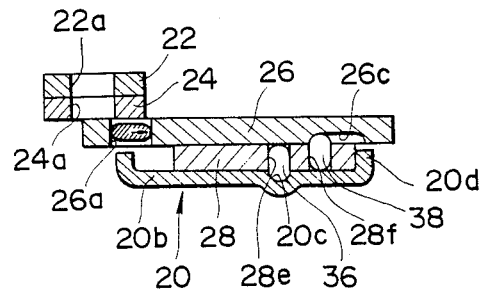
FIGS. 3B and 3C are views similar to FIG. 3A but show various operative conditions of the reverse gear selector mechanism of FIG. 1.

The shifter 26 is also formed with an arcuated groove 26c of constant depth in the surface overlying the shift fork 30. The groove 26c constitutes a circular segment and has a center of curvature coinciding with the center of the pivot pin 29, that is, the fulcrum of the shifter 26. The shift fork 28 is formed at the joint portion 28a with two circular through holes 28e and 28f that are so arranged as to be alignable with the opposed ends of the arcuated groove 26c at the same time as shown in FIG. 1 and FIG. 3A. Slidably disposed within the holes 28e and 28f are two connector pins 36 and 38 that are of the length nearly equal to but a little bit shorter than the sum of the depth of the groove 26c and the thickness of the shift fork joint portion 28a. The lower side flange 20b of the shifter bracket 20 is formed with a round depression 20c that is of substantially the same depth as that of the arcuated groove 26c such that the connector pin 36 or 38 does not protrude from the hole 28e or 28f when received in the depression 20c. The depression 20c is arranged at a location such that one of the holes 28e or 28f is aligned with both the depression 20c and one end of the groove 26c when the other hole 28f or 28e is aligned with the other end of the groove 26c.

The shifter bracket 20 is further formed with a stopper 20d in the form of an upward projection and adapted to be abuttingly engageable with the shift fork 28 to limit the extent of rotation of same in a predetermined direction, that is, in the counterclockwise direction in FIG. 1.

The operation of the gear selector mechanism will now be described.

In neutral, the gear selector mechanism is put into a condition as shown in FIGS. 1 and 3A.

To engage first gear: The striking rod 16 is rotated to allow the finger 18a of the striking lever 18 to engage the notch 22a of the shifter 22, and the striking rod 16 is axially moved rightwardly in FIG. 1 to rotate the shifter 22 counterclockwise in the same drawing, i.e., to move the notch 22a in the direction of ① in FIG. 3A. With this move, the shift fork 30 moves downwardly in FIG. 1 to engage first gear in the transmission.

To engage second gear: The finger 18a of the striking lever 18 is engaged with the notch 22a of the shifter 22 similarly to the first gear selection, and the striking rod 16 is axially moved leftwardly in FIG. 1 to rotate the shifter 22 clockwise in the same drawing, i.e., to move the notch 22a in the direction of ② in FIG. 3A. With this move, the shift fork 30 moves upwardly in FIG. 1 to engage second gear in the transmission.

To engage third gear: The striking rod 16 is returned to neutral to allow the finger 18a of the striking lever 18 to engage the notch 24a of the shifter 24, and the striking rod is moved rightwardly in FIG. 1 to rotate the shifter 24 counterclockwise in the same drawing, i.e., to move the notch 24a in the direction of ③ in FIG. 3A. With this move, the shift fork 32 moves downward in FIG. 1 to engage third gear in the transmission.

To engage fourth gear: The finger 18a of the striking lever 18 is engaged with the notch 24a of the shifter 24 similarly to the third gear selection, and the striking rod 16 is axially moved leftwardly in FIG. 1 to rotate the shifter 24 clockwise in the same drawing, i.e., to move the notch 24a in the direction of ④ in FIG. 3A. With this move, the shift fork 32 moves upwardly in FIG. 1 to engage fourth gear in the transmission.

To engage fifth gear: The striking rod 16 is rotated to allow the finger 18a of the striking lever 18 to engage the notch 26a of the shifter 26, and the striking rod 16 is axially moved rightwardly in FIG. 1 to rotate the shifter 26 counterclockwise in the same drawing, i.e., to move the notch 26a in the direction of ⑤ in FIG. 3A. With this move, the shift fork 34 moves downwardly in FIG. 1 to engage fifth gear in the transmission.

In neutral of the gear selector mechanism as shown in FIG. 3A, the arcuated groove 26c is aligned at the opposed ends with the through holes 28e and 28f and therefore with the connector pins 36 and 38, and the depression 20c in the shifter bracket side flange 20b is aligned with the hole 28e to receive therein the lower end of the connector pin 36 and prevent the upper end of same from protruding into the groove 26c. The connector pin 38 received in the hole 28f partially protrudes at the upper end into one end of the arcuated groove 26c. Upon shifting into fifth gear, the shifter 26 slides on the shift fork 28, allowing the connector pin 38 to relatively move from one end of the groove 26c to the other end. During this slide, the fork shaft 28 is held stationary in neutral due to the stopper 20d of the shifter bracket 20 and the connector pin 36 that is confined within the depression 20c and the hole 28e to lock the shift fork 28 with the shifter bracket side flange 20b.

Figure 3C:
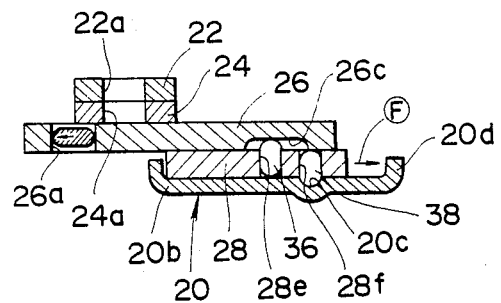

To engage reverse gear: The finger 18a of the striking lever 18 is engaged with the notch 26a similarly to the fifth gear selection, and the striking rod 16 is axially moved leftwardly in FIG. 1 to rotate the shifter 26 clockwise in the same drawing, i.e., to move the notch 26a in the direction of ⓡ in FIG. 3A. With this move, the connector 38 causes the shift fork 28 to rotate in the corresponding direction, i.e., in the clockwise direction in FIG. 1. At the inital state of this rotation of the shift fork 28, the connector pin 36 is driven out of the depression 20c and pushed into the groove 26c. With the further rotation of the shift fork 28, the hole 28f comes to be aligned with the depression 20c, allowing the lower end of the connector pin 38 to be received in the depression 20c and thereby disengaging the driving connection between the shifter 26 and the shift fork 28. Thenceforth, only the shifter 26 is rotated, though a little, to at least partially cover the upper end of the hole 28f for thereby confining the connector pin 38 within the hole 28f and the depression 20c as shown in FIG. 3C. The above rotation of the shift fork 28 causes the reverse idler gear 12 to move from the solid line position into the phantom line position in FIG. 1. At the phantom line position, the reverse idler gear 12 is brought into mesh with other gears such as a reverse input gear and a reverse main gear to reverse the drive line, i.e., to engage reverse gear in the transmission.

In reverse gear position, the transmission is assuredly prevented from slipping out of reverse gear because the shift fork 28 is locked with the side flange 20b of the shifter bracket 20 and cannot move by itself. Therefore, even if the reverse idler gear 12 is subjected to such a load that urges the shift fork 28 counterclockwise in FIG. 1 or in the direction of Ⓕ in FIG. 3C, that load is assuredly supported or carried by the shifter bracket side flange 20b by way of the connector pin 38.

To return the reverse idler gear 12 to neutral, the shifter 26 is rotated counterclockwise in FIG. 1, i.e., the notch 26a is moved rightwardly in FIG. 3C. At the inital stage of this move, the connector pin 36 provides a driving connection between the shifter 26 and the shift fork 28, and the hole 28f is open to the groove 26c to allow the connector pin 36 to be driven out of the depression 20c and pushed into the groove 26c, thus releasing the shift fork 28 from locking engagement with the shifter bracket 20 and allowing the connector pin 36 to drive the shift fork 28 toward neutral. With the further rotation of the shifter 26, the hole 28e comes to be aligned with the depression 20c allowing the lower end of the connector pin 36 to be received in the depression 20c. The reverse idler gear 12 is thus returned to neutral.

Obviously, numerous modifications and variations of the present invention are possible in light of the above teachings. It is therefore to be understood that within the scope of the appended claims, the invention may be practiced otherwise than as specifically described herein.

What is claimed is:

1. A reverse gear selector mechanism in a transmission having a case and a reverse idler gear movable between a first shift position where it is incapable of carrying power and a second shift position where it is capable of carrying power, said mechanism comprising:
    a striking rod rotatably and axially movably mounted on said transmission case;
    a striking lever carried on said striking rod and having a finger;
    a shifter bracket fixedly mounted on said transmission case and having a side flange;
    a pivot pin attached to said side flange;
    a shift fork pivotally mounted on said pivot pin and arranged to partially overlie said shifter bracket side flange, said shift fork being operatively connected with said reverse idler gear and operative to move same into said first and second shift positions when rotated about said pivot pin;
    a shifter pivotally mounted on said pivot pin and arranged to partially overlie said shift fork, said shifter being engageable with said finger of said striking lever and rotatable about said pivot pin when said striking rod is axially moved; and
    means for drivingly connecting said shifter with said shift fork to allow them to rotate together and for locking said shift fork with said shifter bracket side flange when said reverse idler gear is in said second shift position, the locking engagement between the shift fork and the shifter bracket side flange being releasable only when the shifter is rotated to drive the shift fork.

2. A reverse gear selector mechanism as set forth in claim 1, in which said means comprise an arcuated groove of constant depth in said shifter at the surface thereof overlying said shift fork, said groove constituting a circular segment and has a center of curvature coinciding with the center of said pivot pin, two through holes formed in said shift fork and so arranged as to be respectively alignable with the opposed ends of said arcuated groove, two connector pins slidably disposed within said holes and having the length a little bit shorter than the sum of the depth of said arcuated groove and the thickness of said shift fork, and a depression formed in said shifter bracket side flange and having substantially the same depth as that of said arcuated groove, said depression being arranged at a location such that one of said holes is aligned with both said depression and one end of said arcuated groove when the other hole is aligned with the other end of said arcuated groove.

3. A reverse gear selector mechanism as set forth in claim 2, in which said means further comprise a stopper in the form of a projection provided to said shifter bracket side flange and adapted to be abuttingly engageable with said shift fork to limit the extent of rotation of same in a predetermined direction.

4. A reverse gear selector mechanism as set forth in claim 1, in which said shift fork is in the form of having a flat-walled joint portion where it is pivotally mounted on said pivot pin and movably interposed between said shifter and said shifter bracket side flange and also having a bent arm portion extending consecutively from said joint portion to terminate at a forked end straddling part of the circumference of said reverse idler gear.

5. A reverse gear selector mechanism as set forth in claim 1, in which said shifter is in the form of a bell crank having an end formed with a notch for receiving therein said finger of said striking lever and another end operatively connected to a shift fork for selection of forward gear.

6. A reverse gear selector mechanism as set forth in claim 1, in which said shifter bracket includes another side flange opposing to said first-mentioned flange, said shifter and said shift fork being interposed between said shifter bracket side flanges, and said pivot pin being arranged to span the space between said shifter bracket side flanges and attached to same.

* * * * *